Figure 1:
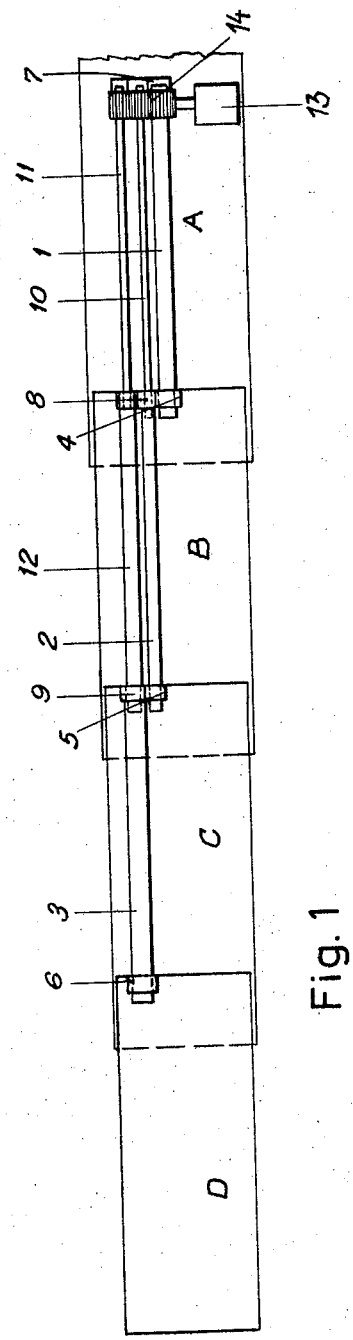

May 3, 1966     W. MESSERSCHMITT     3,249,160

ROTOR BLADE CONSTRUCTION FOR AIRCRAFT

Filed June 10, 1964

INVENTOR.
Willy Messerschmitt

BY Michael S. Striker 3,249,160
ROTOR BLADE CONSTRUCTION FOR AIRCRAFT
Willy Messerschmitt, Munich, Germany, assignor to
Messerschmitt AG., Augsburg, Germany
Filed June 10, 1964, Ser. No. 374,202
7 Claims. (Cl. 170—160.11)

The present invention relates to a rotor blade construction for an aircraft, and more particularly, to an expansible and contractible lifting rotor screw provided on a winged aircraft.

Winged aircraft provided with one or several rotor screws is known, and the purpose of the construction is to permit a substantially vertical take-off or landing in the manner of a helicopter, but known aircraft of this type does not exceed the speed of Mach 0.5. This comparatively low maximum speed is caused by the drag produced by the rotor screw and by the supporting structure on which the rotor screw is mounted.

In my copending application Serial No. 339,917, now abandoned, a convertible aircraft is disclosed in which the rotor screw is stopped when the forward speed of the aircraft is sufficiently high so that the wings of the aircraft can produce a sufficient lifting force. In order to permit the stopping of the rotor screw in flight, the blades of the rotor screw, or rotor screws, have to be shortened during rotary movement of the rotor screw.

It is the object of the present invention to provide a rotor blade construction which permits the increase and decrease of the length of a rotor blade in a particularly efficient and reliable manner.

Another object of the invention is to provide a rotor blade composed of a plurality of telescopically expansible and contractible blade sections, and being provided with means by which the blade sections are positively expanded and contracted.

Another object of the invention is to provide a simple and efficient drive for expanding and contracting the blade sections of a rotor blade.

Another object of the invention is to provide a rotor blade construction in which an expansible and contractible rotor blade is locked against expansion and contraction in intermediate positions so that actuation of a drive motor by an operator is required for expanding and contracting the rotor blade.

With these objects in view, a rotor blade construction according to the present invention comprises a support section, at least one movable section mounted for movement between a retracted position and an advanced position projecting from the support section to increase the length of the rotor blade, and means for moving the movable section between the retracted and advanced positions.

In the preferred embodiment of the invention, the blade sections telescope into each other and are connected by threaded means which are driven by a motor mounted on the support blade section which is the innermost section of the rotor blade.

One embodiment of the invention provides a rotor blade having four blade sections, each of which carries a fixed nut means engaged by a threaded spindle which is mounted on the blade section next in inward direction for turning movement, but non-movable in longitudinal direction. The threaded spindle mounted on the innermost support blade section is directly driven by the motor, while the spindles on the outer blade sections are connected by coupling rods to a transmission driven by the motor. The coupling rods on adjacent blade sections are connected for turning movement, but are slidable relative to each other in longitudinal direction to permit the inward and outward movement of the blade sections.

Figure 2:

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic longitudinal horizontal sectional view illustrating a telescoping rotor blade according to the present invention; and FIG. 2 is a side view of the rotor blade shown in FIG. 1.

Referring now to the drawing, a rotor blade is shown which is part of a rotor screw having a plurality of rotor blades, each of which is collapsible and expansible, and comprises four blade sections A, B, C and D, the innermost section A being a support section and secured to the hub of the rotor screw by known means not illustrated.

Each blade section is hollow, and the next following blade section is smaller to fit into the interior of the preceding blade section so that all blade sections can be moved from the fully expanded position shown in the drawing to a retracted collapsed position in which all blade sections are substantially located within the support section A so that the blade has a length of only one-quarter of its fully expanded length.

Nut means 4, 5 and 6 are secured to the inner end of each of the movable vane sections B, C, D and receive in threaded engagement threaded spindles 1, 2, 3 extending along the preceding inner section.

Threaded spindle 1 is mounted on support blade section A in a bearing 7 which permits turning of spindle 1, but no longitudinal or axial movement. A gear 14 is fixedly secured to spindle 1 and driven by a worm gear, not shown, from a motor 13 mounted in support section A. When spindle 1 rotates, nut means 4 travels along the spindle and draws blade section B into the interior of support section A, and since blade sections C and D are connected to blade section B by the threaded means 2, 5 and 3, 6, blade sections C and D move with blade section B.

Spindle is mounted on blade section B in a bearing 8 which permits no axial movement of spindle 2. Spindle 2 is hollow and is provided with an axially extending projection, not shown, in the interior thereof. A rod 10 is mounted in support section A in a bearing which permits turning movement, but no longitudinal movement. The outer surface of the rod 10 has a longitudinal groove engaged by the longitudinal inner projection of spindle 2. The outer end of rod 10 projects into the inner end of spindle 2, so that rod 10 is coupled to spindle 2 for rotation, while spindle 2 can slide on rod 10 during movement of blade section B from the position shown in FIG. 1 to the retracted position located within support section A.

A gear is fixed to the inner end of rod 10, and meshes with gear 14. Consequently, rod 10 will rotate in a direction opposite to the direction of spindle 1, and spindle 2 will rotate in the same direction as rod 10, so that spindle 2 must be provided with the opposite thread of the thread of spindle 1, for example, if spindle 1 has right-hand thread, spindle 2 and nut 5 must have left-hand thread so that upon rotation of spindle 1 and rod 10, blade sections B and C move in the same direction.

A second rod 11 is also mounted in support section A for turning movement, but non-movable in longitudinal direction in a suitable bearing and has a longitudinally extending groove cooperating with a longitudinally extending inner projection in a hollow third rod 12 which is mounted for turning movement, but non-movable in axial direction, in blade section B. The outer end of rod 11 projects into the inner end of the hollow rod 12 so that rods 11 and 12 are in a coupling engagement. The outer end of the hollow rod 12 projects into the inner end of threaded spindle 3. Rod 12 has on its outer surface a longitudinally extending groove engaged by a corresponding longitudinally extending inner projection in the interior of the hollow spindle 3, so that rod 12 is coupled to spindle 3 for turning movement, but can slide within the same in longitudinal and axial direction, in the same manner as rod 11 can slide in longitudinal and axial direction in the hollow rod 12 during movement of the movable blade sections B, C and D between the illustrated expanded position and the collapsed position in which blade sections B, C and D are located substantially within support blade section A.

A third gear is secured to rod 11 and meshes with the second gear on rod 10 so that rod 11, rod 12 and spindle 3 turn in the same direction as spindle 1, and consequently spindle 3 and nut 6 must have the same thread as spindle 1 and nut 4, for example, right-hand thread.

Bearings 7, 8 and 9 and bearings, not shown, for rods 10, 11 and 12 are preferably connected by joints, not shown, to the respective blade sections in order to prevent bending moments to act on the rods during slight flexing of the rotor blade due to transverse movements of the movable blade sections relative to the farther inner sections, particularly in expanded condition. The bearings for rods 10, 11 and 12 are located at the inner end of the respective blade section, for example, the bearing of hollow rod 12 is located adjacent the bearing 8 of spindle 2 at the inner end of blade section B and supports rod 12 for turning movement, but non-movable in longitudinal direction on blade section B. Bearings for rods 10 and 11 are located adjacent bearing 7 and spindle 1.

In the same manner as the bearings, nuts 4, 5 and 6 are preferably connected by joints to the respective blade sections so that no bending forces are exerted on the spindles when the rotor blade flexes. Nuts 4, 5 and 6 are preferably constructed as ball nuts to reduce the friction.

During operation of the rotor blade, motors 13 of the several rotor blades are simultaneously energized so that gear 14 is rotated and drives the other gears. Rotation of spindle 1 will draw blade section B inwardly into support section A, and rotation of rod 10 will be transmitted to spindle 2, while spindle 2 telescopically slides over rod 10 as blade section B moves inward. During such movement of spindle 2 with blade section B, the rotating spindle 2 will act on nut 5 to draw blade section C into blade section B. During movement of blade section C, the tubular spindle 3 will slide over rod 12.

The rotating rod 11 turns rod 12 and spindle 3 so that the outermost blade section D is drawn into blade section C. During the inward movement of the blade sections, the hollow rod 12 slides telescopically over rod 11.

When the motor 13 is reversed, the spindles are driven to rotate in the opposite direction so that the rotor blade expands.

As explained above, the direct meshing engagement between the gears on spindle 1 and rods 10 and 11 necessitates the use of opposite threads. In modification, intermediate gears are provided between the three gears shown in FIG. 1, so that spindle 1 and rods 10 and 11 with spindles 2 and 3 all rotate in the same direction so that all spindles can be provided with right-hand thread.

From the above description it will become apparent that the several blade sections are connected by threaded means of which comprises a spindle element and a nut element secured to adjacent blade sections so that by rotation of one element the respective outer blade section can be telescopically moved into and out of the next inner blade section. The threaded means are self-locking, and do not permit relative movement of the blade sections unless driven by the motor.

It will be understood that each of the elements described above, or two or more together, may also find a useful application in other types of rotor screws differing from the types described above.

While the invention has been illustrated and described as embodied in a rotor blade expanded and contracted by threaded means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An expansible and contractible rotor blade for an aircraft comprising, in combination, a supporting member; a first blade section member mounted on said supporting member for movement between a retracted position and an advanced position outwardly projecting from said supporting member; a second blade section member mounted on said first blade section member for movement between a retracted position and an advanced position outwardly projecting from said first blade section member; first moving means mounted on said supporting member or on said first blade section member and engaging the other of said members for moving, when actuated, said first blade section member relative to said supporting member between retracted and advanced positions; second moving means mounted on said first blade section member or said second blade section member and engaging the other of said members for moving, when actuated, said second blade section member relative to said first blade section member between retracted and advanced positions; and central actuating means for simultaneously actuating said first and second moving means for moving said second blade section member from advanced position into retracted position and moving said first blade section member relative to said supporting member from advanced to retracted position or for moving both said blade section members from their retracted into their advanced positions, whereby any expansion or contraction of the rotor blade is attained with relatively slowly moving means at a relatively great speed and without substantially changing during such movement the general configuration of said rotor blade.

2. A rotor vane as defined in claim 1; and further comprising at least one further blade section member mounted on said second blade section member for movement between a retracted position, and an advanced position projecting from said second blade section member, and third moving means connecting said third blade section member with said second blade section member, and wherein said first moving means comprises first threaded means, said second moving means comprising second threaded means and said third moving means comprises third threaded means, each threaded means including a nut element and a spindle element one of which elements is turnable, said first moving means further comprising a first rod mounted for turning movement and connected with the turnable element of said second threaded means for turning movement with the same and for movement of said last-mentioned turnable element in longitudinal direction of said first rod, and a second rod mounted for turning movement and connected with said turnable element of said third threaded means.

3. A rotor blade as defined in claim 2; and further comprising transmission means connected to said turnable element of said first threaded means and to both of said rods for rotating said last-mentioned turnable element and said rods with said turnable element of said second and third threaded means.

4. A rotor blade as defined in claim 3; wherein said central actuating means comprises a motor for driving said transmission means.

5. A rotor blade as defined in claim 4; wherein said motor is reversible.

6. A rotor blade as defined in claim 5, wherein at least said first and second blade section members are hollow and wherein each successive one of the blade section members is telescopically receivable inside the preceding blade section member.

7. A rotor blade as defined in claim 6, wherein said second rod comprises two portions, one of which is hollow to telescopically receive the other portion.

References Cited by the Examiner

UNITED STATES PATENTS

| | | | |
|---|---|---|---|
| 2,146,481 | 2/1939 | Manning | 170—160.3 |
| 2,163,481 | 6/1939 | Cameron | 170—160.11 X |
| 2,423,095 | 7/1947 | Gibson | 244—43 |
| 2,464,285 | 3/1949 | Andrews | 170—160.11 X |
| 2,713,393 | 7/1955 | Isacco | 170—160.11 |
| 3,128,829 | 4/1964 | Young | 170—160.11 |

SAMUEL LEVINE, *Primary Examiner.*

JULIUS E. WEST, *Examiner.*

E. A. POWELL, JR., *Assistant Examiner.*